(12) United States Patent
Batra et al.

(10) Patent No.: US 8,606,701 B2
(45) Date of Patent: Dec. 10, 2013

(54) ESTABLISHING PERSONALIZED MOBILE MONEY TRANSFER LIMITS

(75) Inventors: Vishal Singh Batra, New Delhi (IN); Dinesh Garg, Beawar (IN); Ravi Kothari, New Delhi (IN); Raghuram Krishnapuram, Bangalore (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 13/459,973

(22) Filed: Apr. 30, 2012

(65) Prior Publication Data

US 2013/0290170 A1    Oct. 31, 2013

(51) Int. Cl.
*G06Q 40/00* (2012.01)

(52) U.S. Cl.
USPC .............................................. 705/39; 705/35

(58) Field of Classification Search
USPC ....................................... 705/35, 39
See application file for complete search history.

(56) References Cited

U.S. PATENT DOCUMENTS

| | | | |
|---|---|---|---|
| 2006/0009994 A1* | 1/2006 | Hogg et al. ...................... | 705/1 |
| 2009/0265272 A1 | 10/2009 | Dill et al. | |
| 2010/0114744 A1* | 5/2010 | Gonen ............................ | 705/35 |
| 2010/0153185 A1* | 6/2010 | Ghosh et al. .................... | 705/10 |
| 2010/0222132 A1* | 9/2010 | Sanford et al. .................. | 463/25 |
| 2010/0250436 A1 | 9/2010 | Loevenguth et al. | |
| 2011/0280160 A1* | 11/2011 | Yang ............................. | 370/259 |
| 2012/0023008 A1* | 1/2012 | Owen et al. ..................... | 705/39 |

FOREIGN PATENT DOCUMENTS

WO    2009148732    12/2009

OTHER PUBLICATIONS

Jennifer Anna Jeffs. Payment Systems and Global Financial Order. Graduate Department of Political Science, University of Toronto. 2005.*
Robin L. Rambaud. Online Transactions and Levels of Identity. Washington University, Sever Insitute of Technology, Department of Engineering and Policy. Dec. 2004.*
Brian David Schwartz. Deficiencies in Regulations for Anti-Money Laundering in a Cyberlaundering Age Including COMET: Central Online AML Merchant Enforcement Tool. 2009.*
Davidson, Neil, et al., "Driving Customer Usage of Mobile Money for the Unbanked", Published online Mar. 7, 2011, 33 pages. available at http://mmublog.org.marketing/ as of Apr. 20, 2012, GSMA publishers, London, England.
Wamuyu, Patrick, et al., "Factors influencing successful use of mobile technologies to facilitate E-Commerce in small enterprises: The case of Kenya", The African Journal of Information Systems, Sep. 1, 2011, 25 pages, vol. 3, Issue 2, Article 2, Kennesaw State Unviersity, Kennesaw, GA, USA.

* cited by examiner

*Primary Examiner* — Muriel Tinkler
(74) *Attorney, Agent, or Firm* — Ference & Associates LLC

(57) ABSTRACT

Methods and arrangements for establishing financial transfer limits. A customer reputation score for mobile money transfer is determined. A mobile money transfer limit is established based on the customer reputation score, and the customer reputation score is updated in response to predetermined parameters.

20 Claims, 4 Drawing Sheets

ESTABLISHING PERSONALIZED MOBILE MONEY TRANSFER LIMITS

BACKGROUND

Generally, it has happened that person-to-person (P2P) Mobile Money Transfer (MMT) services have at times been exploited for illicit activities such as money laundering. To reduce Money Laundering (ML) risk (or that of other illicit activities), suggestions have arisen to reduce various parameters, including: the amount of money being transferred in a single P2P transaction; transaction frequency; transaction gap; total transaction amount in a given time. However, it can be appreciated that a conservative limit and one-for-all policy on the above recommendations can have an adverse effect on a general MMT business model.

BRIEF SUMMARY

In summary, one aspect of the invention provides a method comprising: determining a customer reputation score for mobile money transfer; establishing a mobile money transfer limit based on the customer reputation score; and updating the customer reputation score in response to predetermined parameters.

Another aspect of the invention provides an apparatus comprising: at least one processor; and a computer readable storage medium having computer readable program code embodied therewith and executable by the at least one processor, the computer readable program code comprising: computer readable program code configured to determine a customer reputation score for mobile money transfer; computer readable program code configured to establish a mobile money transfer limit based on the customer reputation score; and computer readable program code configured to update the customer reputation score in response to predetermined parameters.

An additional aspect of the invention provides a computer program product comprising: a computer readable storage medium having computer readable program code embodied therewith, the computer readable program code comprising: computer readable program code configured to determine a customer reputation score for mobile money transfer; computer readable program code configured to establish a mobile money transfer limit based on the customer reputation score; and computer readable program code configured to update the customer reputation score in response to predetermined parameters.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
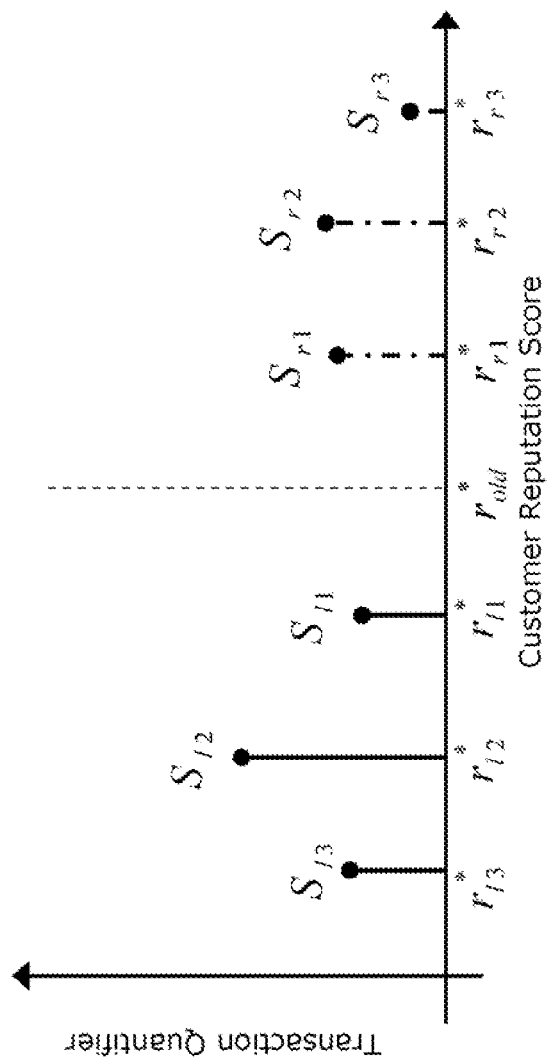
FIG. 1 schematically illustrates a process for updating user parameters over time.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

In accordance with at least one embodiment of the invention, there is broadly contemplated herein an arrangement for providing personalized MMT limits for a customer to boost MMT service while safeguarding against ML. Contemplated herein is a Customer Reputation Score (CRS), which correlates to risk, or a CRS-based approach for personalizing MMT to mitigate ML risk while optimizing the MMT transaction constraints for customers. A method as contemplated herein is designed for P2P transactions and where the service allows a recipient to withdraw cash (which can represent a high risk transaction).

In accordance with at least one embodiment of the invention, constraints computed by the system include, for a sender, recipient and sender-recipient pair: per MMT limit; total MMT limit (for a given period); MMT frequency (number of transactions allowed in a given number of hours); total number of MMT transactions (in a given period); total number of distinct senders/recipients permissible; and exceptions (or overriders).

In accordance with a first approach and at least one embodiment of the invention, a first-order analysis is conducted. Here, the Recipient's CRS is not factored in. Mainly, the analysis is based on the Sender's CRS, and thereby is calculated with regard to a customer's personal information, his/her loyalty, and his/her MMT distribution. A customer's personal information can include here: completeness score (system-validated); relevance (or richness) score; correctness score; and de-duplication score (system-computed) (e.g., involving customers with different names but having the same address and/or date of birth). A customer's loyalty here can involve: an in-network score (e.g., longer-standing customers get a lower risk rating than newer customers); and a change frequency score (e.g., customers changing and rejoining networks frequently are given higher risk score, while new customer information can be analyzed against previous records along with de-duplication techniques).

In accordance with at least one embodiment of the invention, a customer's MMT distribution can involve: a multiplicity-of-senders score (e.g., distribution of distinct senders); total, maximum, average and minimum transfer amount, and number of transfers in comparison to customers with similar CRS; time series distribution of money flow (e.g., inward, outward and withdrawal); transfer repetitiveness score; and an out-of-network transfer score (e.g., to assign a higher risk when transferring out of network).

In accordance with a second approach, in accordance with at least one embodiment of the invention, a second-order analysis is conducted. This is based on the Recipient's and Sender's CRSs. Particularly, a sender-receiver reputation score is estimated based on a sender's CRS, a recipient's CRS, and a sender-recipient affinity score. The affinity score can involve: network affinity (e.g., same vs. different network); jurisdiction affinity (e.g., within vs. outside of the country); voice calls between sender and recipient and their distribution over time and during MMT; SMSs exchanged between sender and recipient and their distribution over time and during MMT; and MMT repetitiveness (frequency and amount). Exceptions can be applied which would yield higher scores and MMT Limits. Such exceptions can involve members of a family or group plan holders, thereby yielding a higher sender-recipient affinity score.

Figure 2:
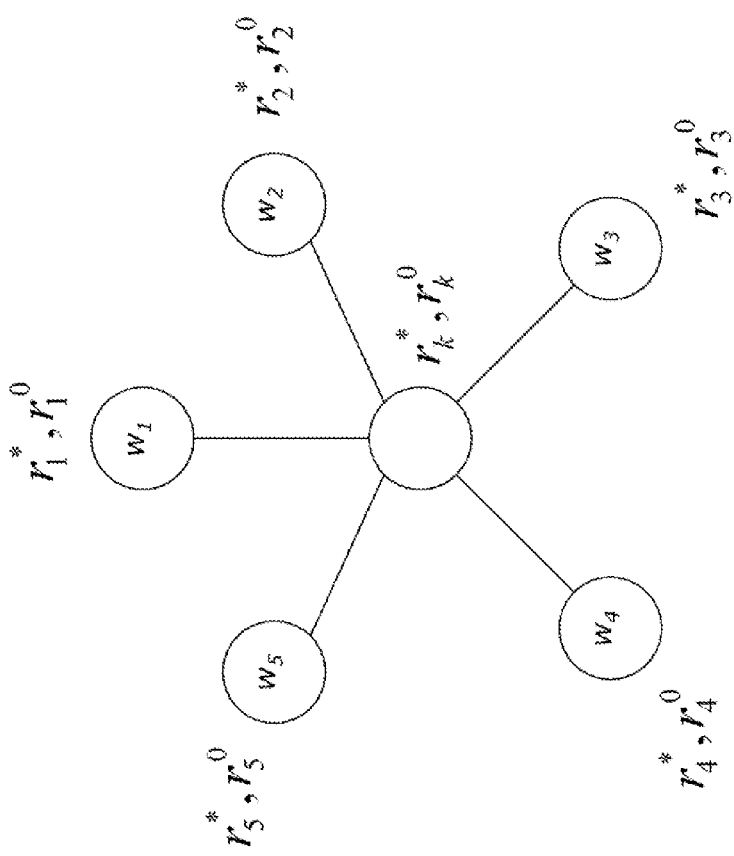
FIG. 2 illustrates a node diagram relating to the process of FIG. 1.

FIG. 1 schematically illustrates a process for updating user parameters over time, in accordance with at least one embodiment of the invention, while FIG. 2 illustrates a node diagram relating to the process of FIG. 1. Both figures may now be referred to simultaneously.

In accordance with at least one embodiment of the invention, a new user in an MMT network is assigned default MMT parameters based on his/her initial CRS, which would be based solely on the customer's personal information. Over time, as the user transacts with other users in the system, his/her MMT parameters are updated and revised based on reputation scores of these users, in accordance with the approach illustrated via FIGS. 1 and 2.

In accordance with at least one embodiment of the invention, as illustrated graphically in FIG. 1, and by way of a non-restrictive example, customer r may start with an initial or existing reputation score $r^*_{old}$. If an initial score, it can represent a predetermined default score. He or she may be in a position to engage in transactions with other entities (e.g., customers) having lower customer reputation scores $r_{lk}$, and with other entities (e.g., customers) having higher customer reputation scores $r_{rk}$, wherein in each case (in the present example) k={1,2,3}. Where $S_a$ represents a quantity corresponding to previous transactions with customers with scores $r_{lk}$ and $r_{rk}$, and in the present example a={lk, rk}, a revised customer reputation score $r^*_{new}$ can be calculated as follows:

$$r^*_{new} = r^*_{old} + \frac{\sum_{k=1}^{3}(r^*_{rk} - r^*_{old})S_{rk} - \sum_{k=1}^{3}(r^*_{old} - r^*_{lk})S_{lk}}{\sum_{k=1}^{3}S_{rk} + \sum_{k=1}^{3}S_{lk}}. \quad (1)$$

As touched on herein, it should be appreciated that the transaction quantifier (y-axis) in FIG. 1 can embody any of a number of parameters such as: MMT limit; total MMT limit (for a given period); MMT frequency (number of transactions allowed in a given number of hours); total number of MMT transactions (in a given period); and total number of distinct senders/recipients permissible; exceptions (or overriders). As such, a new customer MMT limit $S^*_{new}$, based on any of the aforementioned quantifying parameters or others, can be calculated from an old limit $S^*_{old}$ thusly:

$$S^*_{new} = S^*_{old}\left(\frac{r^*_{new}}{r^*_{old}}\right). \quad (2)$$

It can thus be appreciated, in accordance with at least one embodiment of the invention, that a CRS can relate to the CRSs of other entities with whom a customer has previously transacted, and also to the (quantitative) degree to which the customer has transacted with those other entities. As such, the numerator of the fraction in equation (1) can become positive or negative, depending on whether there has been a quantitative preponderance of transaction activity with entities of a higher or lower CRS, respectively, thereby resulting in a $r^*_{new}$ (new CRS) that is higher or lower, respectively, than the $r^*_{old}$ (old CRS) A similar effect will play out, as seen in equation (2) on the MMT limit S* of the customer in question. (It can also be noted that, inasmuch as S* for a customer may well change considerably over time, it is conceivable to place an upper limit on S* for a customer in view of the possibility of perpetual increases in value thereof.)

In accordance with at least one embodiment of the invention, for every node k, the initial CRS score, $0 \leq r_k^0 \leq 1$, can be updated and revised in accordance with equation (1) hereinabove (to result in updated CRS scores over time, labeled in FIG. 2 as $r^*_k$), while taking into account network structure and edge weights, $0 \leq w_j \leq 1$. Edge weights can be inferred from CDR data, group plans, social networks, etc. These edge weights are used for smoothening of the reputation scores that were computed using non-network related features. For example, if a customer with an initial score of 0.9 connects with a customer with an initial score of 0.1, the customer having a high edge weight would cause the 0.9 value to decrease slightly and the 0.1 value to increase slightly. Generally, the network depicted in the node diagram of FIG. 2 represents explicit or implicit relationships between customers of a given enterprise or institution, and this can represent input to a system as broadly contemplated herein.

Accordingly, and to rephrase, in accordance with at least one embodiment of the invention and as shown in the node diagram of FIG. 2, inputs can be effected into an equation (such as equation (1) above) that themselves are initially weighted on the basis of the possibility, e.g., of close relationships that a customer may have with other entities/customers. Such close relationships can come about from being in the same family, corporate financial network, or other communities with mutually trusting individuals. This has the effect of transferring "credit" between mutually trusting individuals.

Figure 3:
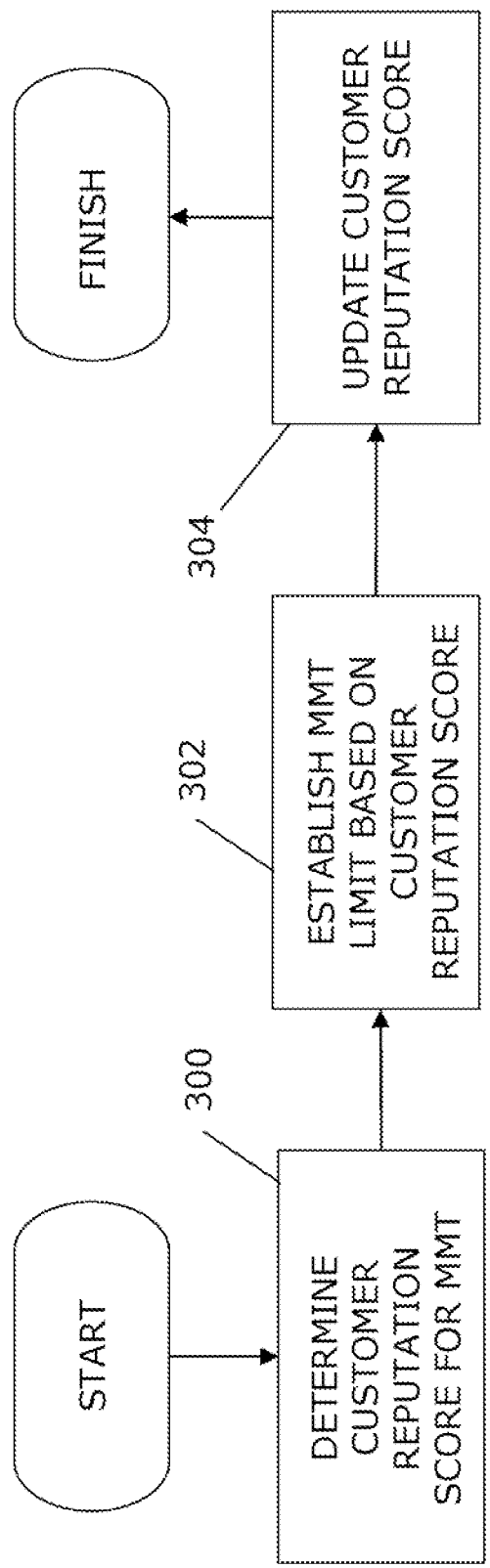
FIG. 3 sets forth a process more generally for establishing financial transfer limits.

FIG. 3 sets forth a process more generally for establishing financial transfer limits, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way a processing unit or units and system memory such as those indicated, respectively, at 16' and 28' in FIG. 4.

As shown in FIG. 3, a customer reputation score is determined for mobile money transfer (300). A mobile money transfer limit based on the customer reputation score (302), and the customer reputation score is updated in response to predetermined parameters (304).

Figure 4:
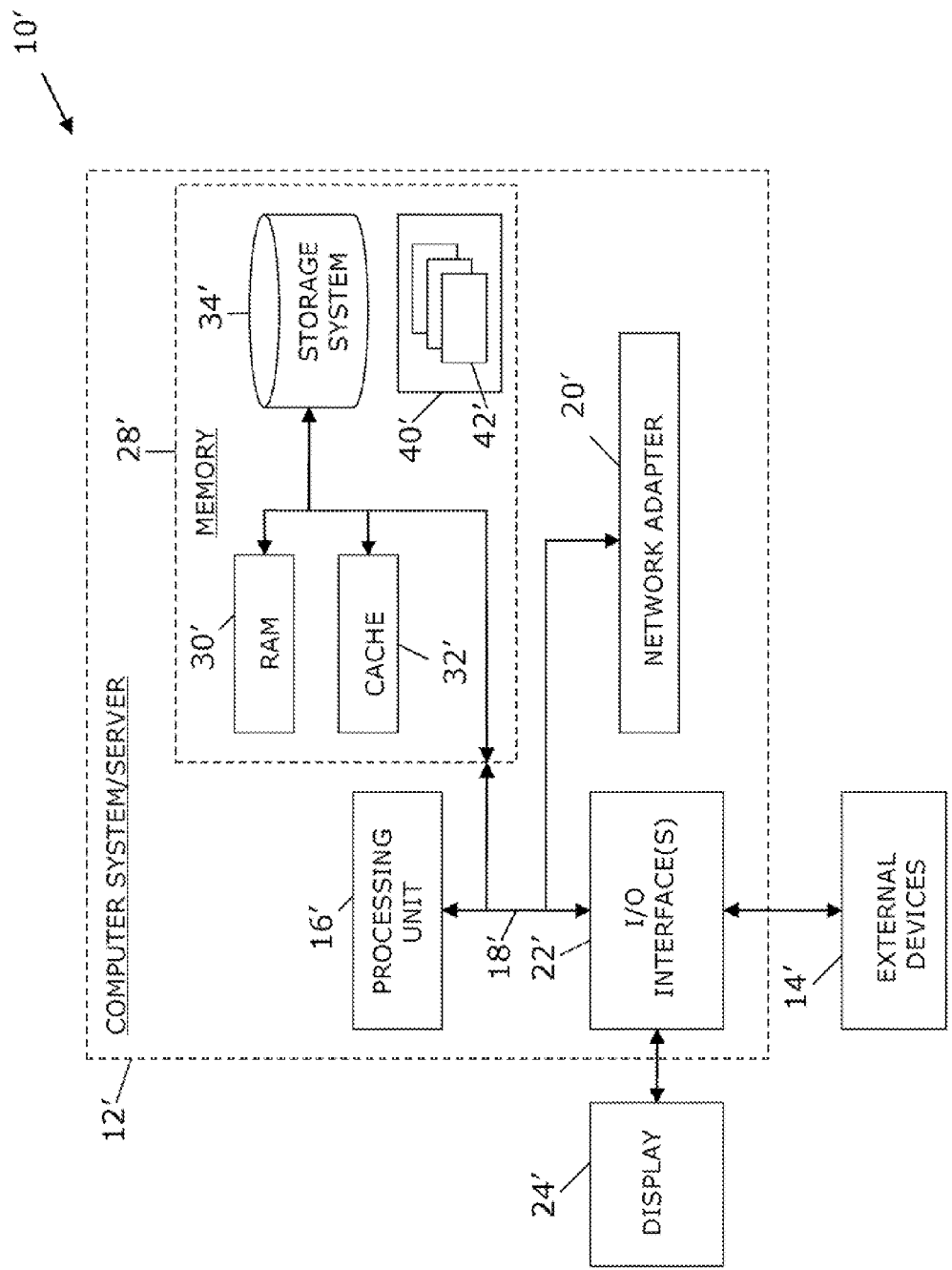
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use b, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium (an article of manufacture) implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
  utilizing at least one processor to execute computer code configured to perform the steps of:
  determining a customer reputation score for mobile money transfer;
  establishing a mobile money transfer limit for money laundering prevention, based on the customer reputation score, wherein the mobile money transfer limit comprises a parameter selected from the group consisting of: number of transactions per predetermined time period; per-transaction monetary limit; monetary limit per predetermined time period; frequency of transactions in a predetermined time period; and total number of distinct senders and recipients permissible; and dynamically updating the customer reputation score in response to predetermined parameters.

2. The method according to claim 1, wherein said determining comprises obtaining and evaluating historical information on mobile money transfers of the customer.

3. The method according to claim 1, wherein said determining comprises obtaining and evaluating historical information on mobile money transfers between the customer and other customers.

4. The method according to claim 1, wherein said establishing comprises determining a customer exception to a mobile money transfer limit.

5. The method according to claim 1, wherein said determining comprises obtaining at least one information item selected from the group consisting of: customer personal information; customer loyalty information; and customer mobile money transfer distribution information.

6. The method according to claim 5, wherein the customer personal information comprises at least one parameter selected from the group consisting of: a completeness score; a relevance score; a correctness score; and a de-duplication score.

7. The method according to claim 5, wherein the customer loyalty information comprises at least one parameter selected from the group consisting of: an in-network score; and a change frequency score.

8. The method according to claim 5, wherein the customer mobile money transfer information comprises at least one parameter selected from the group consisting of: a multiplicity-of-senders score; a total transfer amount; a maximum transfer amount; an average transfer amount; a minimum transfer amount; a number of transfers in comparison to customers with a similar customer reputation score; a time series distribution of financial flow; a transfer repetitiveness score; and an out-of-network transfer score.

9. The method according to claim 1, wherein said determining comprises obtaining information on a reputation score of another customer.

10. The method according to claim 9, wherein said determining comprises determining a sender-receiver affinity score.

11. The method according to claim 10, wherein the sender-receiver affinity score is derived from at least one parameter selected from the group consisting of: network affinity; jurisdiction affinity; general communication between sender and recipient; distribution of communication between sender and recipient over time; communication between sender and recipient during mobile money transfer; frequency of mobile money transfer; and at least one mobile money transfer amount.

12. The method according to claim 1, wherein said updating comprises incorporating at least one edge weight into at least one contributor to the customer reputation score.

13. The method according to claim 12, wherein the at least one edge weight is based on at least one factor unrelated mobile money transfers between the customer and other customers and has a smoothening effect on the customer reputation score.

14. The method according to claim 1, wherein said updating comprises incorporating a time decay factor into at least one contributor to the customer reputation score, wherein time elapsed since a previous transaction corresponds to an increase in the customer reputation score.

15. An apparatus comprising:
at least one processor; and
a computer readable storage medium having computer readable program code embodied therewith and executable by the at least one processor, the computer readable program code comprising:
computer readable program code configured to determine a customer reputation score for mobile money transfer;
computer readable program code configured to establish a mobile money transfer limit for money laundering prevention, based on the customer reputation score, wherein the mobile money transfer limit comprises a parameter selected from the group consisting of: number of transactions per predetermined time period; per-transaction monetary limit; monetary limit per predetermined time period; frequency of transactions in a predetermined time period; and total number of distinct senders and recipients permissible; and
computer readable program code configured to dynamically update the customer reputation score in response to predetermined parameters.

16. A computer program product comprising:
a computer readable storage medium having computer readable program code embodied therewith, the computer readable program code comprising:
computer readable program code configured to determine a customer reputation score for mobile money transfer;
computer readable program code configured to establish a mobile money transfer limit for money laundering prevention, based on the customer reputation score, wherein the mobile money transfer limit comprises a parameter selected from the group consisting of: number of transactions per predetermined time period; per-transaction monetary limit; monetary limit per predetermined time period; frequency of transactions in a predetermined time period; and total number of distinct senders and recipients permissible; and
computer readable program code configured to dynamically update the customer reputation score in response to predetermined parameters.

17. The computer program product according to claim 16, wherein said computer readable program code is configured to obtain historical information on mobile money transfers of the customer.

18. The computer program product according to claim 16, wherein said computer readable program code is configured to determine a customer exception to a mobile money transfer limit.

19. The computer program product according to claim 16, wherein said computer readable program code is configured to obtain information on a reputation score of another customer.

20. The computer program product according to claim 16, wherein said computer readable program code is configured to update via incorporating at least one edge weight into at least one contributor to the customer reputation score.

* * * * *